(12) United States Patent
Fong et al.

(10) Patent No.: US 11,870,353 B2
(45) Date of Patent: Jan. 9, 2024

(54) DYNAMIC LOADING FOR A SWITCHING POWER SUPPLY

(71) Applicant: Microsoft Technology Licensing, LLC, Redmond, WA (US)

(72) Inventors: Chee Kiong Fong, Saratoga, CA (US); Geoffrey Jason Shew, Redmond, WA (US); Suet Fong Tin, Redmond, WA (US); Michael R. Volkman, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 128 days.

(21) Appl. No.: 17/490,846

(22) Filed: Sep. 30, 2021

(65) Prior Publication Data
US 2023/0104550 A1 Apr. 6, 2023

(51) Int. Cl.
*H02M 3/335* (2006.01)
*H02M 1/00* (2006.01)
*H02M 3/158* (2006.01)

(52) U.S. Cl.
CPC ..... *H02M 3/33569* (2013.01); *H02M 1/0043* (2021.05); *H02M 3/1584* (2013.01)

(58) Field of Classification Search
CPC ............. H02M 3/1584; H02M 1/0043; H02M 3/33569; H02J 2207/20; H02J 7/0014
See application file for complete search history.

(56) References Cited

U.S. PATENT DOCUMENTS 4,471,422 A 9/1984 Hierholzer, Jr.
4,587,604 A 5/1986 Nerone
(Continued)

FOREIGN PATENT DOCUMENTS

EP 3098922 A1 11/2016
KR 101392854 B1 5/2014

OTHER PUBLICATIONS

Erb, et al., "An Integrated Bi-Directional Power Electronic Converter with Multi-level AC-DC/DC-AC Converter and Non-inverted Buck-Boost Converter for PHEVs with Minimal Grid Level Disruptions", In Proceedings of IEEE Vehicle Power and Propulsion Conference, Sep. 1, 2010, 6 Pages.
(Continued)

*Primary Examiner* — Alex Torres-Rivera
(74) *Attorney, Agent, or Firm* — Holzer Patel Drennan (57) ABSTRACT

A power supply unit provides power to a common output node. The power supply unit includes a first power conversion block electrically coupled to convert the electrical power input to a first output power supply share supplied to the common output node. The first power conversion block is configured to decrease output voltage from the first power conversion block based on output current from the first power conversion block reaching a rated current level. A second power conversion block is electrically coupled to convert the electrical power input to a second output power supply share supplied to the common output node. The second power conversion block is configured with a pre-designated open circuit voltage setting and is further configured to contribute the second output power supply share to the common output node based on the output voltage at the common output node decreasing to the predesignated electrical voltage setting.

20 Claims, 8 Drawing Sheets

(56) References Cited

U.S. PATENT DOCUMENTS

| | | | |
|---|---|---|---|
| 5,452,197 A | 9/1995 | Rice | |
| 7,211,969 B2 | 5/2007 | Chou et al. | |
| 9,806,705 B2 | 10/2017 | Landry et al. | |
| 2002/0144163 A1 | 10/2002 | Goodfellow et al. | |
| 2008/0138680 A1* | 6/2008 | Hu | H02J 1/10 320/103 |
| 2022/0021221 A1* | 1/2022 | Tyagi | H02M 1/007 |

OTHER PUBLICATIONS

"International Search Report and Written Opinion Issued in PCT Application No. PCT/US22/038119", dated Nov. 23, 2022, 12 Pages.

\* cited by examiner

DYNAMIC LOADING FOR A SWITCHING POWER SUPPLY

BACKGROUND

Electronic devices, such as computing devices, communication devices, and Internet-of-Things (IoT) devices, include one or more power supplies. Furthermore, many electronic devices can operate at different load scenarios. For example, in "awake" mode, an electronic device can demand a higher load from its power supply than in a "sleep" mode.

SUMMARY

The described technology provides a power supply unit for providing converted power from an electrical power input to a common output node. The power supply unit includes a first power conversion block electrically coupled to convert the electrical power input to a first output power supply share supplied to the common output node. The first power conversion block is configured to decrease output voltage from the first power conversion block based at least in part on output current from the first power conversion block reaching a rated current level. The power supply unit also includes a second power conversion block electrically coupled to convert the electrical power input to a second output power supply share supplied to the common output node. The second power conversion block is configured with a predesignated open circuit voltage setting and is further configured to contribute the second output power supply share to the common output node based at least in part on the output voltage at the common output node decreasing to the predesignated electrical voltage setting.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Many power supplies are more efficient at different power loads. For example, a main power converter of a power supply unit (PSU) in an electronic device may be less efficient at lower loads and more efficient at higher loads, while an auxiliary or standby power converter may be more efficient at lower loads and less efficient at higher loads. Furthermore, fast responses by a PSU to changes in power load can also provide improved efficiency of the overall power supply. Use of digital logic and load balancers to manage load changes in a PSU is expensive and does not provide the desired rapid response and efficiency. Naturally, electronic device manufacturers wish to design their products with the highest efficiency possible to reduce power consumption from the electrical grid, to extend the useful period on a single battery charge, and to extend the useful lifetime of a battery. Nevertheless, optimizing power supply efficiency under different load conditions is a challenging engineering objective.

The described technology provides a system for dynamically coordinating two or more power supplies at different load conditions. The system includes multiple power converters tuned to variable load conditions, such that the system sequences the power supplied by the different power conversion blocks according to the substantially most efficient operation.

Figure 1:
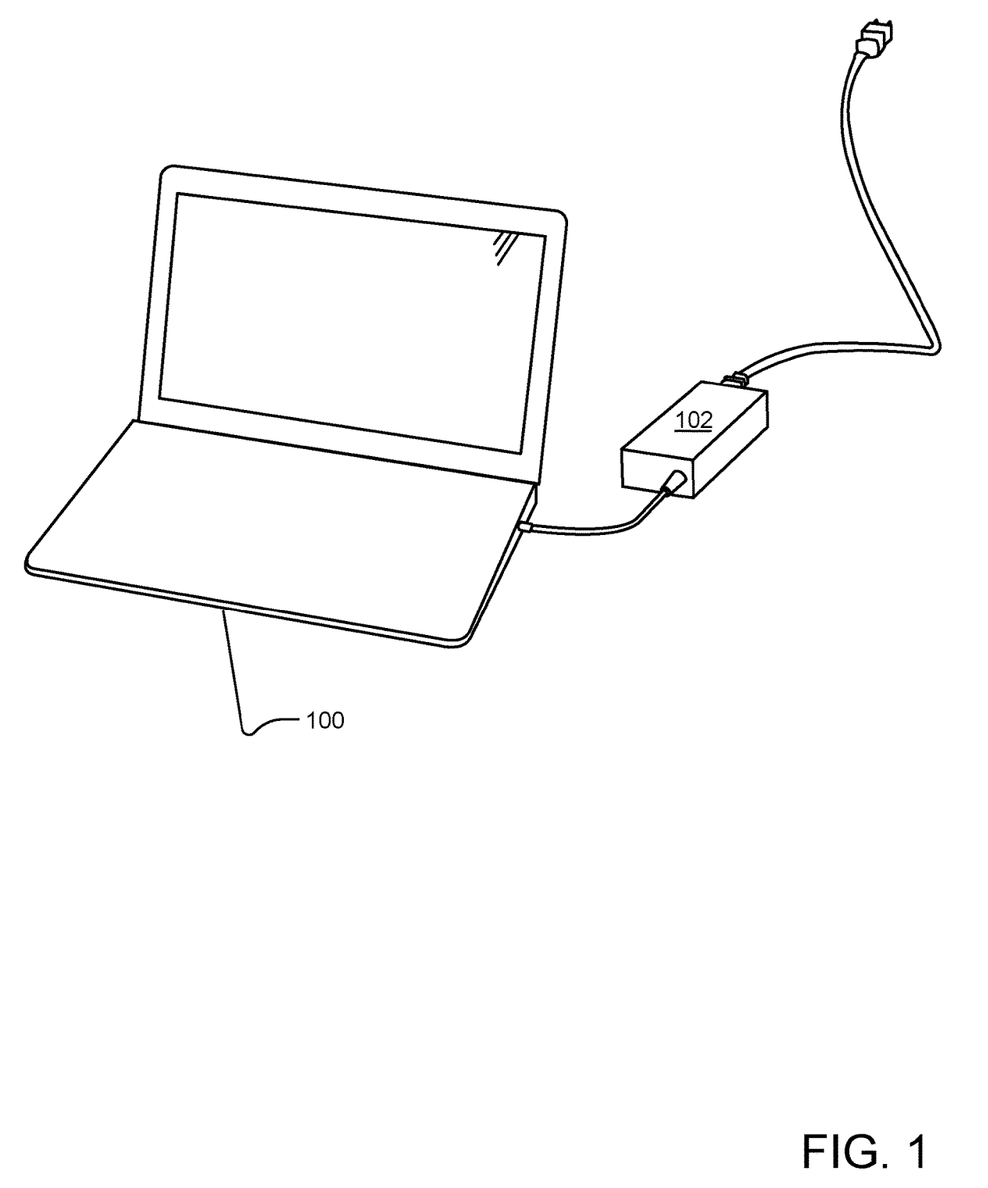
FIG. 1 illustrates an example electronic device powered with dynamic loading by a switching power supply.

FIG. 1 illustrates an example electronic device 100 powered with dynamic loading by a switching power supply. The electronic device 100 is shown in FIG. 1 as a laptop computer, but other electronic devices that demand variable power loads may be powered by the described technology. An implementation of the described technology may be implemented, for example, within a power supply unit (such as a PSU 102), which receives alternating current (AC) power from an electrical grid and converts it to direct current (DC) power for the electronic device 100. In other implementations, the PSU may reside within the electronic device 100.

Within the PSU 102, power supply circuitry includes multiple power conversion blocks capable of contributing to supply power efficiently at a variable power load in the electronic device 100. The power load can, for example, vary between "sleep" power mode (a light load) and an "awake" power mode (a heavy load), between driving a single peripheral (e.g., a display) or multiple peripherals (e.g., displays, external hard drives). One type of power converter can be designed for best efficiency at light loads, while another can be designed for best efficiency at heavy loads. As such, multiple power converters can be included in the PSU 102 to operate primarily in load conditions that correspond to each power converter's best efficiency. Furthermore, the described technology provides a low-cost design (e.g., a design that does not require expensive load balancing logic or expensive enable logic that is responsive to system standby signals) while providing a rapid transition between different power converters to make the best use of each power converter's most efficient operation. In some implementations, individual power conversion blocks can contribute their power supply shares in aggregate to a common output node. In other implementations, an individual power conversion block can provide its power supply share to the common output node, while one or more other power conversion blocks are excluded from providing their power supply share to the common output node. Note, however, that the one or more other power converters may still provide ancillary power contributions, such as to maintain a charge on input capacitors.

The PSU 102 includes two or more power conversion blocks. In one implementation, the PSU 102 includes two power conversion blocks, one that dominates the power supplied to a common output node (see output 206) in light load conditions and another that dominates the power supplied to the common output node in heavy load conditions. In other implementations, additional power conversion blocks may be included to accommodate more granular load conditions. The contributions of each power conversion block are managed according to relative setpoints (e.g., predesignated open circuit voltage settings) of the output voltage. In this manner, the multiple power conversion blocks can coordinate their power contributions to the common output node while maximizing or substantially maximizing the power conversion efficiency of the PSU 102 with relying on expensive logic or external signals provided by the applications, operating system, or firmware of the electronic device 100.

Figure 2:
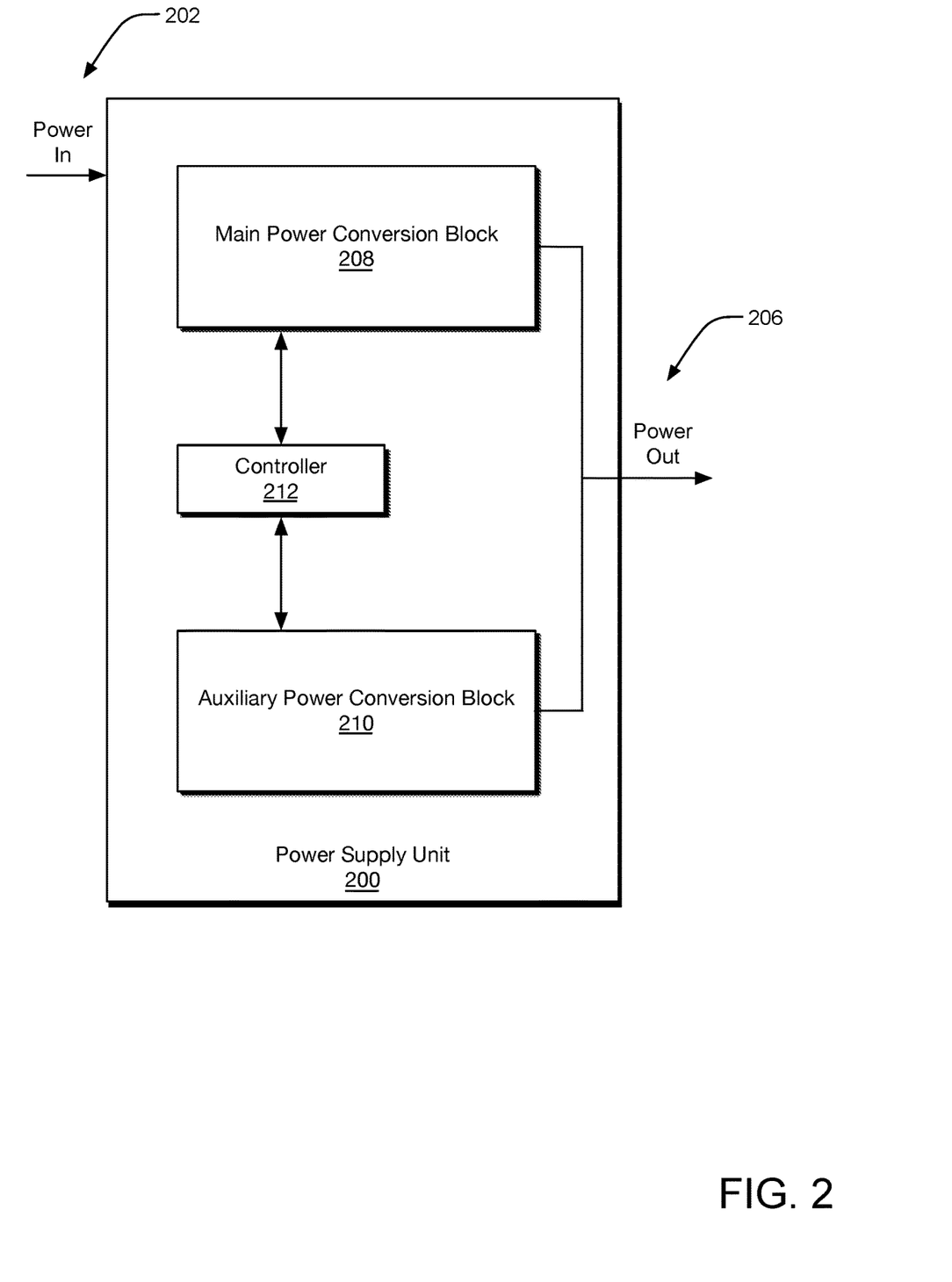
FIG. 2 illustrates an example power supply unit (PSU) providing dynamic loading for a switching power supply with two power conversion blocks.

FIG. 2 illustrates an example power supply unit (PSU 200) providing dynamic loading for a switching power supply with two power conversion blocks. The PSU 200 receives AC power at an input 202 and converts it into DC power, which it supplies to the common output node.

The PSU 200 includes a main power conversion block 208 and an auxiliary power conversion block 210. The main power conversion block 208 has higher power conversion efficiency at heavier loads than the auxiliary power conversion block 210. The auxiliary power conversion block 210 is configured with a predesignated open circuit voltage setting (e.g., 12 volts) and in an operational mode in which the output voltage at the common output node decreases as the output current from the auxiliary power conversion block 210 reaches (e.g., increases to) a rated current level. This operational mode may be accomplished, for example, by setting the auxiliary power conversion block 210 to operating in a constant current mode or a constant power mode, although other implementations may be employed. As such, as power supplied to the common output node increases (e.g., past a predesignated point), the output voltage at the common output node decreases (e.g., to maintain the constant current to the common output node). It should be understood that the terms "constant current mode," "constant power mode," and "constant voltage mode" refer to the circuit configurations that maintain a substantially constant current/power/voltage in select ranges of operations, and that the levels of these parameters may vary slightly from their respective set levels during operation in those select ranges.

In contrast, the main power conversion block 208 is configured with a predesignated open circuit voltage setting (e.g., 11 volts) that is lower than the predesignated open circuit voltage setting of the auxiliary power conversion block 210. In one implementation, the main power conversion block 208 is configured to operating in a constant voltage mode, although other implementations may be employed. Accordingly, at light loads (e.g., where the output voltage at the common output node is greater than the predesignated open circuit voltage setting of the main power conversion block 208), the auxiliary power conversion block 210 provides all or most of the output power to the common output node. The main power conversion block 208 contributes substantially no output power share to the common output node at such a light load. As the power supplied to the common output node increases to a point (a heavy load) where the output voltage at the common output node decreases to the predesignated open circuit voltage setting of the main power conversion block 208 (e.g., 11 volts), the main power conversion block 208 is enabled to contribute to the output power supplied to the common output node, supplying some or all of the output power, depending on the implementation.

In one implementation, the PSU 200 may include a controller 212, which can terminate the supply of output power by either of the power conversion blocks. For example, if the auxiliary power conversion block 210 has low efficiency in a portion of the heavy load range, the controller 212 can turn off the output power contribution of the auxiliary power conversion block 210 to the common output node in that portion of the heavy load range. In this manner, the PSU 200 can rely on the more efficient power conversion block in the corresponding portion of a load range and turn off the power output of the less efficient power conversion block in that portion of the load range, thereby increasing the aggregate power conversion efficiency of the PSU 200. In one aspect, this allows the converters to work sequentially in their respective regions of highest efficiency in some implementations.

Figure 3:
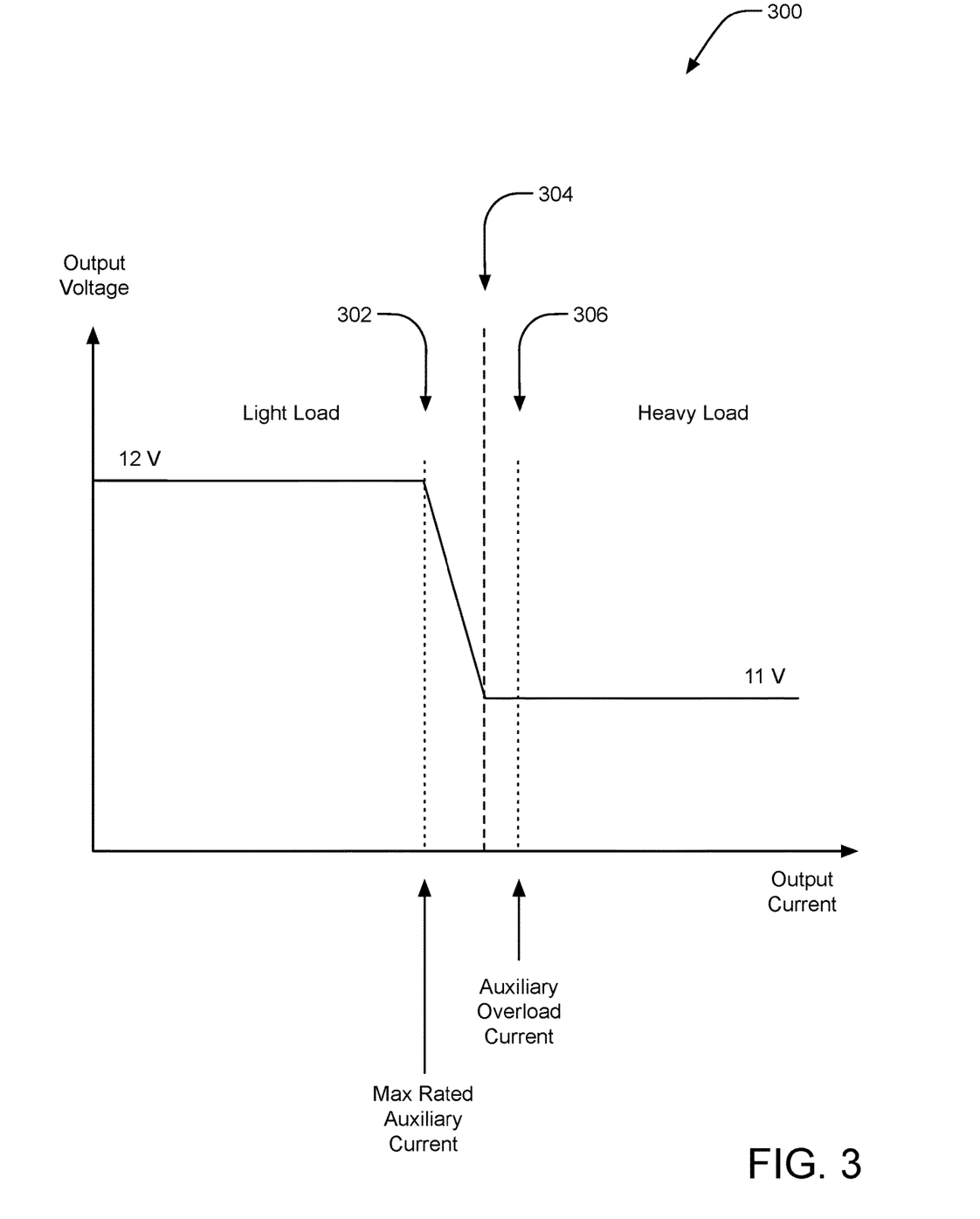
FIG. 3 illustrates example power supply operational characteristics at two different loads with two power conversion blocks.

FIG. 3 illustrates example power supply operational characteristics 300 under two different loads with two power conversion blocks. The y-axis represents output voltage at a common output node, and the x-axis represents output current to the common output node. An auxiliary power conversion block is configured with a predesignated open circuit voltage setting (e.g., a setpoint) of 12 volts, and a main power conversion block is configured with a predesignated open circuit voltage setting of 11 volts.

In a light load range, the auxiliary power conversion block supplies output power to the common output node at a substantially constant output voltage, primarily or entirely to the exclusion of the main power conversion block. However, as the power supplied to the common output node increases, the auxiliary power conversion block reaches a point at which its output current is constrained by the maximum rated current of the auxiliary power conversion block. That is, the power supplied to the common output node reaches a point at which the auxiliary power conversion block cannot supply a higher output current, and therefore the output voltage begins to decrease at a point 302 according to Ohm's Law. It should be understood, however, that the voltage/current curve may follow a different type of curve (e.g., a different decreasing curve as one or more other power conversion blocks switch on).

At a point 304, the output voltage at the common output node has decreased to 11 volts (the predesignated open circuit voltage setting of the main power conversion block), which causes the main power conversion block to begin to contribute a share of output power to the common output node. In one implementation, the predesignated open circuit voltage setting of the main power conversion block is set to a voltage that will "turn on" the main power conversion block before the auxiliary power conversion block is overloaded (at point 306).

In one implementation, the main power conversion block provides all of the power to the common output node in the heavy load range (e.g., power supplied by the auxiliary power conversion block is terminated by a controller that monitors the output current from the main power conversion block). As the power load drops to a certain value, the auxiliary power conversion block can turn on again (and the main power conversion block can turn off again) without overhead and power disruption to the electronic device. In an alternative implementation (e.g., at a power load level where the auxiliary power conversion block is efficient), the auxiliary power conversion block can still contribute a share of the total power supplied to the common output node.

An example scenario is provided below herein. Assuming the load objective is to draw 25 W, based on the load tables below. Because the auxiliary power conversion block maxes out at 20 W, then at a 25 W load, the power supply unit can be configured such that both converters can support the total load or only the main power conversion block can support the total load. From the efficiencies charts below, the total efficiency is better if the design supplies power from the main power conversion block in this state—the load is consolidated to the main power conversion block in its more efficient load condition. The overall efficiency of the power supply unit depends on the efficiency curves for each power conversion block, so, if the load table parameters are different, another implementation may achieve a more efficient load condition using both the main power conversion block and the auxiliary power conversion block within a same portion of the load range.

Efficiency Per Converter:

| Aux Output Power | Aux Converter Efficiency | Main Converter Output Power | Main Converter Efficiency |
|---|---|---|---|
| 5 W | 80% | 5 W | 50% |
| 20 W | 90% | 20 W | 80% |
| 25 W | n/a | 25 W | 87% |

Total Efficiency for 25 W Load Scenario:

| | 25 W Load Scenario 1: Aux supplies 20 W Main supplies 5 W | 25 W Load Scenario 2: Aux supplies 0 W Main supplies 25 W |
|---|---|---|
| Output power (W) | 25 | 25 |
| Aux Input Power (W) | 22.2 | 0.0 |
| Main Input Power (W) | 10.0 | 28.7 |
| Total input Power Loss (W) | 7.2 | 3.7 |
| Efficiency | 78% | 87% |

Figure 4:
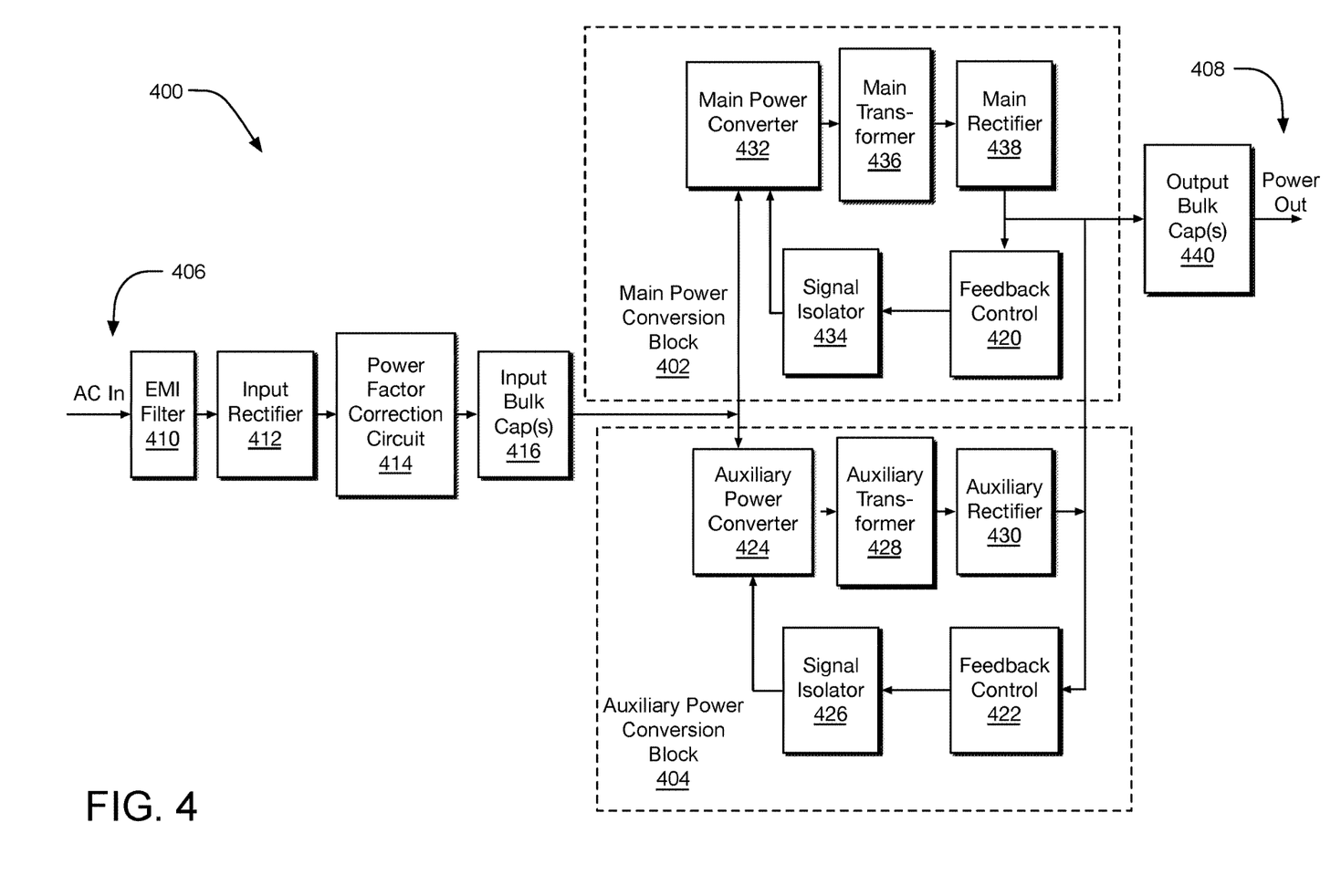
FIG. 4 illustrates a schematic of an example power supply unit (PSU) providing dynamic loading for a switching power supply with three power conversion blocks.

FIG. 4 illustrates a schematic of an example power supply unit (PSU 400) providing dynamic loading for a switching power supply with two power conversion blocks (a main power conversion block 402 and an auxiliary power conversion block 404). The PSU 400 receives AC power at input 406 and outputs DC power at output 408. The input 406 passes the AC power through an electromagnetic interference filter 410 to an input rectifier 412, which converts the AC power to a rectified signal. In an implementation (e.g., of a power supply united of greater than 75 Watts), the rectified signal is passed through a power factor correction (PFC) circuit 414 to shape the input current in order to maximize the real power from the AC power source. In other implementations, the PFC may be omitted.

Input bulk capacitors 416 receive the rectified signal and smooths it for input to the main power conversion block 402 and/or the auxiliary power conversion block 404. In one implementation, the input bulk capacitors 416 may all be connected to the input to the conversion blocks, or some or all of the input bulk capacitors 416 may be distributed into conversion blocks themselves.

The schematic of FIG. 4 illustrates an example power supply unit in which the main power conversion block 402 is more efficient at power conversion under heavy loads and the auxiliary power conversion block 404 is more efficient at power conversion under lighter loads. Accordingly, in one or more embodiments, the PSU 400 is designed to allocate all or most of the power conversion in a light load range to the auxiliary power conversion block 404 and all or most of the power conversion in a heavy load range to the main power conversion block 402. Nevertheless, other designs may be employed. The "heavy" and "light" terminology is intended to provide a relative magnitude to the variable loads at different operation scenarios, and the extents of the heavy and light load ranges are dependent upon the efficiency of the different conversion blocks over the ranges. For example, an example main power conversion block may suffer from lower efficiency as compared to the auxiliary power conversion block at some load up to 20 Watts. Likewise, the auxiliary power conversion block may be unable to supply power at loads greater than its maximum load rating of 20 Watts. It should be understood that the maximum loads, maximum currents, overload currents, and predesignated open circuit voltage settings of any conversion block may be designed to support defined operational characteristics for the electronic device.

Because the main power conversion block 402 is less efficient at lighter power loads, the auxiliary power conversion block 404 is set to a higher predesignated open circuit voltage setting than the main power conversion block 402 so that the auxiliary power conversion block 404 turns on before the main power conversion block 402 at lighter power loads. The "turn on" setpoint of each conversion block is controlled by the predesignated open circuit voltage setting and is based on the output voltage at the common output node of each conversion block, which is monitored by feedback controls in each conversion block (i.e., a feedback control 420 in the main power conversion block 402 and a feedback control 422 in the auxiliary power conversion block 404)— a conversion block turns on when the output voltage at the common output node drops below the corresponding predesignated open circuit voltage setting.

In the auxiliary power conversion block 404, the feedback control 422 monitors the output voltage at the common output node and controls the operation of an auxiliary power converter 424 through a signal isolator 426 (such as an opto-coupler). If the predesignated open circuit voltage setting of the auxiliary power conversion block 404 is set to 12 volts and the output voltage is 12 volts or lower, then the feedback control 422 enables the auxiliary power converter 424 to supply power through an auxiliary transformer 428 and an auxiliary rectifier 430 to the common output node.

Likewise, in the main power conversion block 402, the feedback control 420 monitors the output voltage at the common output node and controls the operation of a main power converter 432 through a signal isolator 434 (such as an opto-coupler). If the predesignated open circuit voltage setting of the main power conversion block 402 is set to 11 volts and the output voltage decreases to 11 volts, then the feedback control 420 enables the main power converter 432 to supply power through a main transformer 436 and a main rectifier 438 to the common output node.

As such, based on the relative predesignated open circuit voltage settings of the individual conversion blocks, one or both conversion blocks may be supplying power to the common output node. In an alternative implementation, a controller (not shown) may be used to turn off one or the other conversion block in an effort to increase the overall efficiency of the PSU 400 in certain load ranges.

Output bulk capacitors 440 receive the rectified signal(s) from one or both of the conversion blocks and smooths the rectified signal(s) for output to the electronic device. In one implementation, the output bulk capacitors 440 may all be connected to the outputs of both conversion blocks, or some or all of the output bulk capacitors 440 may be distributed into conversion blocks themselves.

Figure 5:
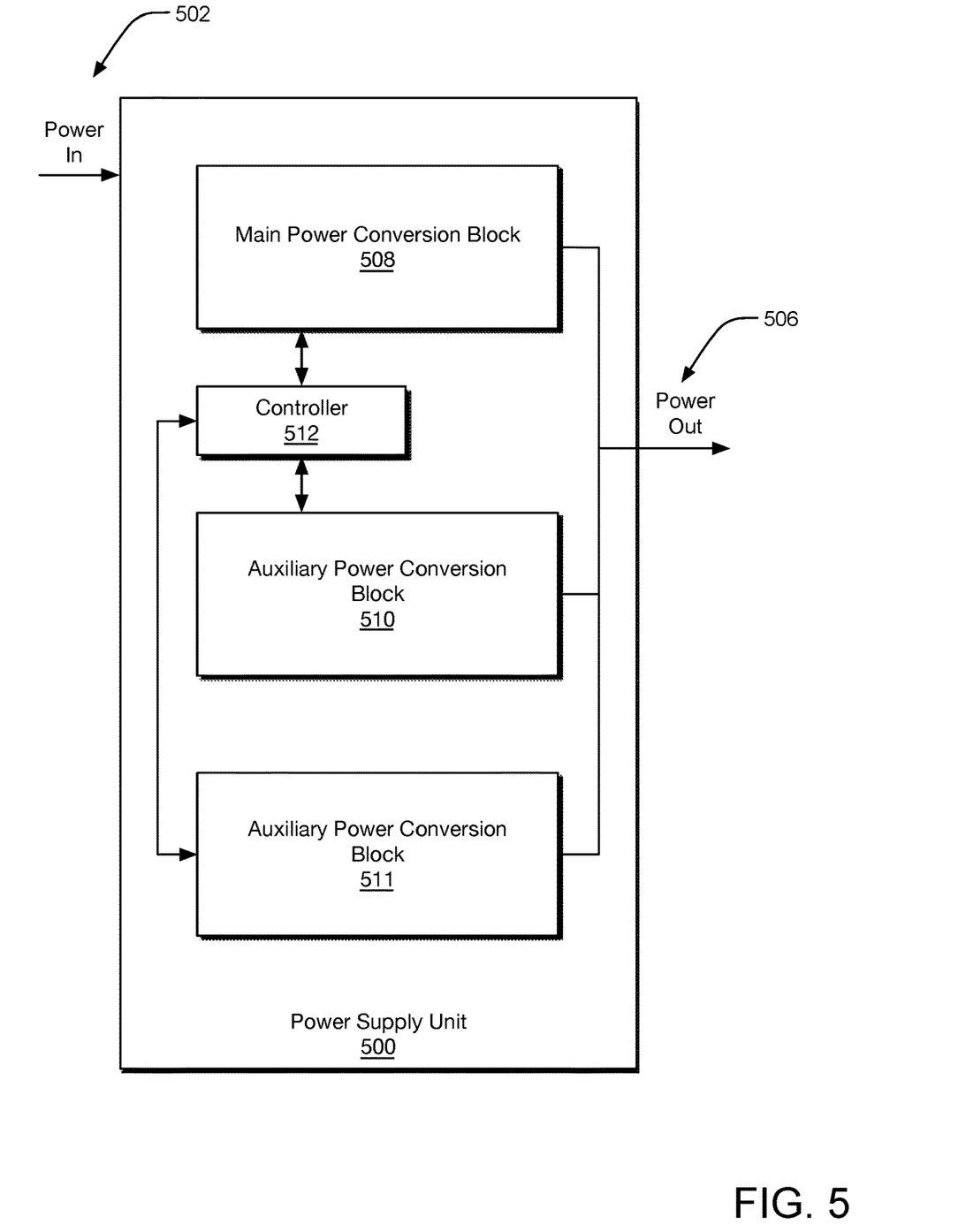
FIG. 5 illustrates an example power supply unit (PSU) providing dynamic loading for a switching power supply with three power conversion blocks.
Figure 6:
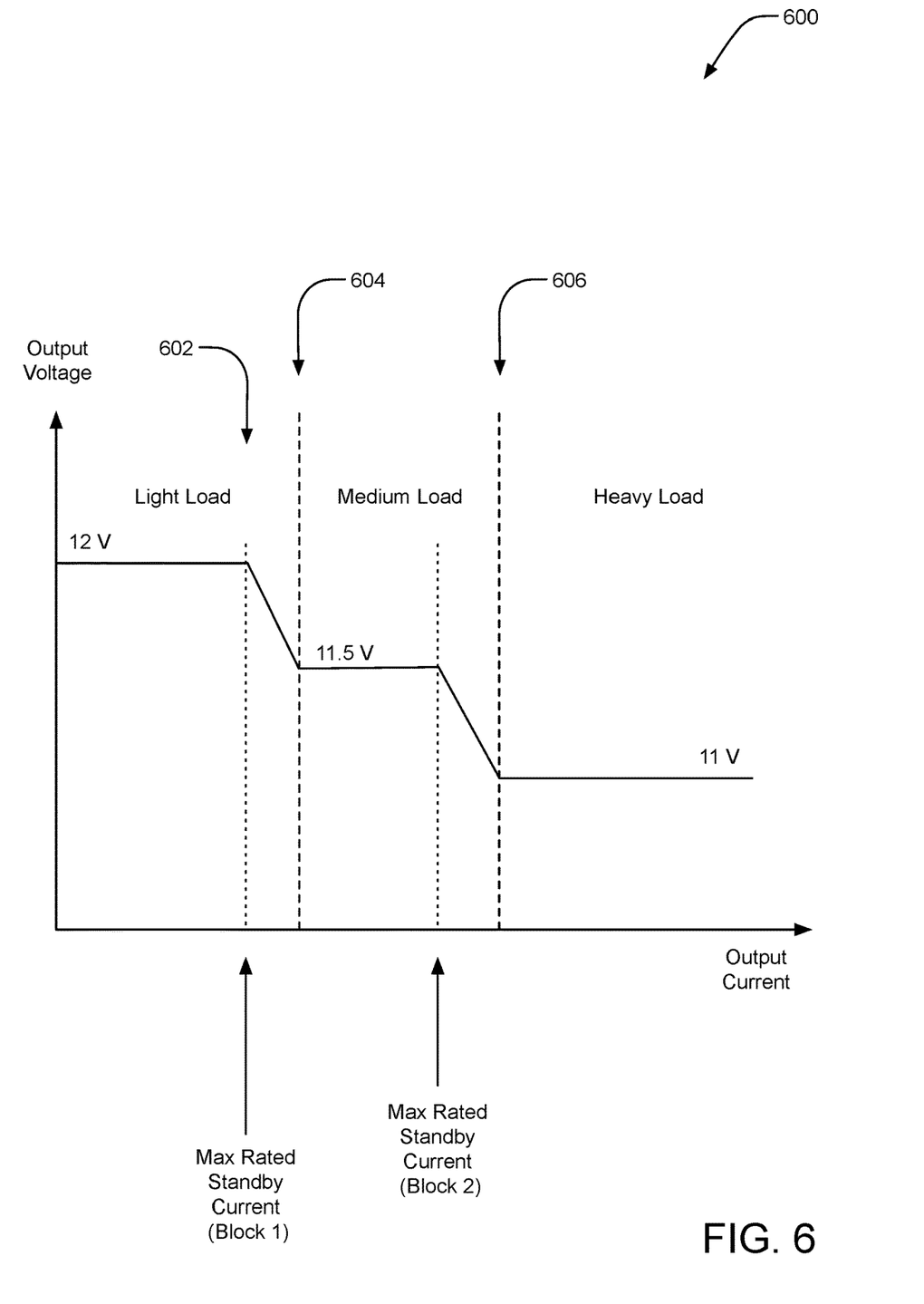
FIG. 6 illustrates example power supply operational characteristics at three different loads with three power conversion blocks.

FIG. 5 illustrates an example power supply unit (PSU) 500 providing dynamic loading for a switching power supply with three power conversion blocks. The PSU 500 receives AC power at an input 502 and converts it into DC power, which it supplies to a common output The PSU 500 includes a main power conversion block 508, an auxiliary power conversion block 510, and an auxiliary power conversion block 511. The main power conversion block 508 has higher power conversion efficiency at heavier loads than the auxiliary power conversion block 510 and the auxiliary power conversion block 511. Likewise, the auxiliary power conversion block 510 has higher power conversion efficiency at heavier loads than the auxiliary power conversion block 511. As can be seen in FIG. 6, this configuration provides three different load ranges in which one or more of the power conversion blocks are supplying power to the common output node.

The auxiliary power conversion block 510 is configured with a predesignated open circuit voltage setting (e.g., 12 volts) and in an operational mode in which the output voltage at the common output node decreases as the output current from the auxiliary power conversion block 510 reaches a rated current level. This operational mode may be accomplished, for example, by setting the auxiliary power conversion block 510 to operate in a constant current mode or a constant power mode, although other implementations may be employed. As such, as the power at the common output node increases, the output voltage at the common output node decreases (e.g., to maintain the constant current or power to the common output node). For example, in one or more implementations, each auxiliary power conversion block will reach its substantially maximum load capacity before the "next" power conversion block begins to supply power, wherein "next" refers to the power conversion block with the next lower predesignated open circuit voltage setting. Other implementations may be employed wherein reaching the substantially maximum load capacity is not a prerequisite to turning on another power conversion block.

In contrast, the auxiliary power conversion block 511 is configured with a predesignated open circuit voltage setting (e.g., 11.5 volts) and in an operational mode in which the output voltage at the common output node decreases as the output current from the auxiliary power conversion block 511 reaches another rated current level. This operational mode may be accomplished, for example, by setting the auxiliary power conversion block 511 to operate in a constant current mode or a constant power mode, although other implementations may be employed. As such, as the power at the common output node increases into the medium load range, the output voltage at the common output node decreases (e.g., to maintain the constant current or power to the common output node).

It should be understood that more than two auxiliary power conversion blocks may be used to provide finer-grained control over power conversion efficiency in additional subdivisions of the total electrical load range.

The main power conversion block 508 is configured with a predesignated open circuit voltage setting (e.g., 11 volts) that is lower than the predesignated open circuit voltage setting of the auxiliary power conversion block 510 and the auxiliary power conversion block 511. In one implementation, the main power conversion block 508 is configured to operating in a constant voltage mode, although other implementations may be employed. Accordingly, at light loads (e.g., where the output voltage at the common output node is greater than the predesignated open circuit voltage setting of the main power conversion block 508), one or both of the auxiliary power conversion blocks provide all or most of the output power to the common output node. The main power conversion block 508 contributes substantially no output power to the common output node at such a light load. As the power at the common output node increases to a point (a heavy load) where the output voltage at the common output node decreases to the predesignated open circuit voltage setting of the main power conversion block 508 (e.g., 11 volts), the main power conversion block 508 contributes to the output power supplied to the common output node, supplying some or all of the output power, depending on the implementation.

In one implementation, the PSU 500 may include a controller 512, which can terminate the supply of output power by any of the power conversion blocks. For example, if the auxiliary power conversion block 510 has low efficiency in a portion of the medium load range, the controller 512 can turn off the output power contribution of the auxiliary power conversion block 510 to the common output node in that portion of the medium load range. Likewise, if the auxiliary power conversion block 511 has low efficiency in a portion of the heavy load range, the controller 512 can turn off the output power contribution of the auxiliary power conversion block 511 to the common output node in that portion of the heavy load range. Similarly, the controller 512 can also turn off the power contribution of the main power conversion block 508. In this manner, the PSU 500 can rely on the more efficient power conversion block or blocks in the corresponding portion of the load range and turn off the power output of the less efficient power conversion block(s) in that portion of the load range, thereby increasing the aggregate power conversion efficiency of the PSU 500.

FIG. 6 illustrates example power supply operational characteristics 600 under three different loads with three power conversion blocks. The y-axis represents output voltage at a common output node, and the x-axis represents output current at the common output node. An auxiliary power conversion block 1 is configured with a predesignated open circuit voltage setting (e.g., a setpoint) of 12 volts, an auxiliary power conversion block 2 is configured with a predesignated open circuit voltage setting of 11.5 volts, and a main power conversion block is configured with a predesignated open circuit voltage setting of 11 volts.

In a light load range, the auxiliary power conversion block supplies output power to the common output node at a substantially constant output voltage, primarily or entirely to the exclusion of the main power conversion block and the auxiliary power conversion block 2. However, as the power load increases, the auxiliary power conversion block 1 reaches a point at which its output current is constrained by the maximum rated current of the auxiliary power conversion block 1. That is, the load reaches a point at which the auxiliary power conversion block 1 cannot supply a higher output current, and therefore the output voltage at the common output node begins to decrease at a point 602 according to Ohm's Law or another similar relationship.

At a point 604 in the medium load range, the output voltage at the variable load has decreased to 11.5 volts (the predesignated open circuit voltage setting of the auxiliary power conversion block 2), which causes the auxiliary power conversion block 2 to begin to contribute a share of output power to the common output node. In one implementation, the predesignated open circuit voltage setting of the main power conversion block is set to a voltage that will "turn on" the auxiliary power conversion block 2 before the auxiliary power conversion block 1 is overloaded.

At a point 606, the output voltage at the variable load has decreased to 11 volts (the predesignated open circuit voltage setting of the main power conversion block), which causes the main power conversion block to begin to contribute a share of output power to the common output node. In one implementation, the predesignated open circuit voltage setting of the main power conversion block is set to a voltage that will "turn on" the main power conversion block before the auxiliary power conversion blocks are overloaded.

In one implementation, the main power conversion block provides all of the power to the common output node in the heavy load range (e.g., power supplied by the auxiliary power conversion block is terminated by a controller that monitors the output current from the main power conversion block). In an alternative implementation (e.g., at a load level where the auxiliary power conversion block is efficient), one or both of the auxiliary power conversion block contributes a share of the power supplied to the variable electrical load. For example, in one or more implementations, each auxiliary power conversion block will reach its substantially maximum load capacity before the "next" power conversion block begins to supply power, wherein "next" refers to the power conversion block with the next lower predesignated open circuit voltage setting. Other implementations may be employed wherein reaching the substantially maximum load capacity is not a prerequisite to turning on another power conversion block.

Figure 7:
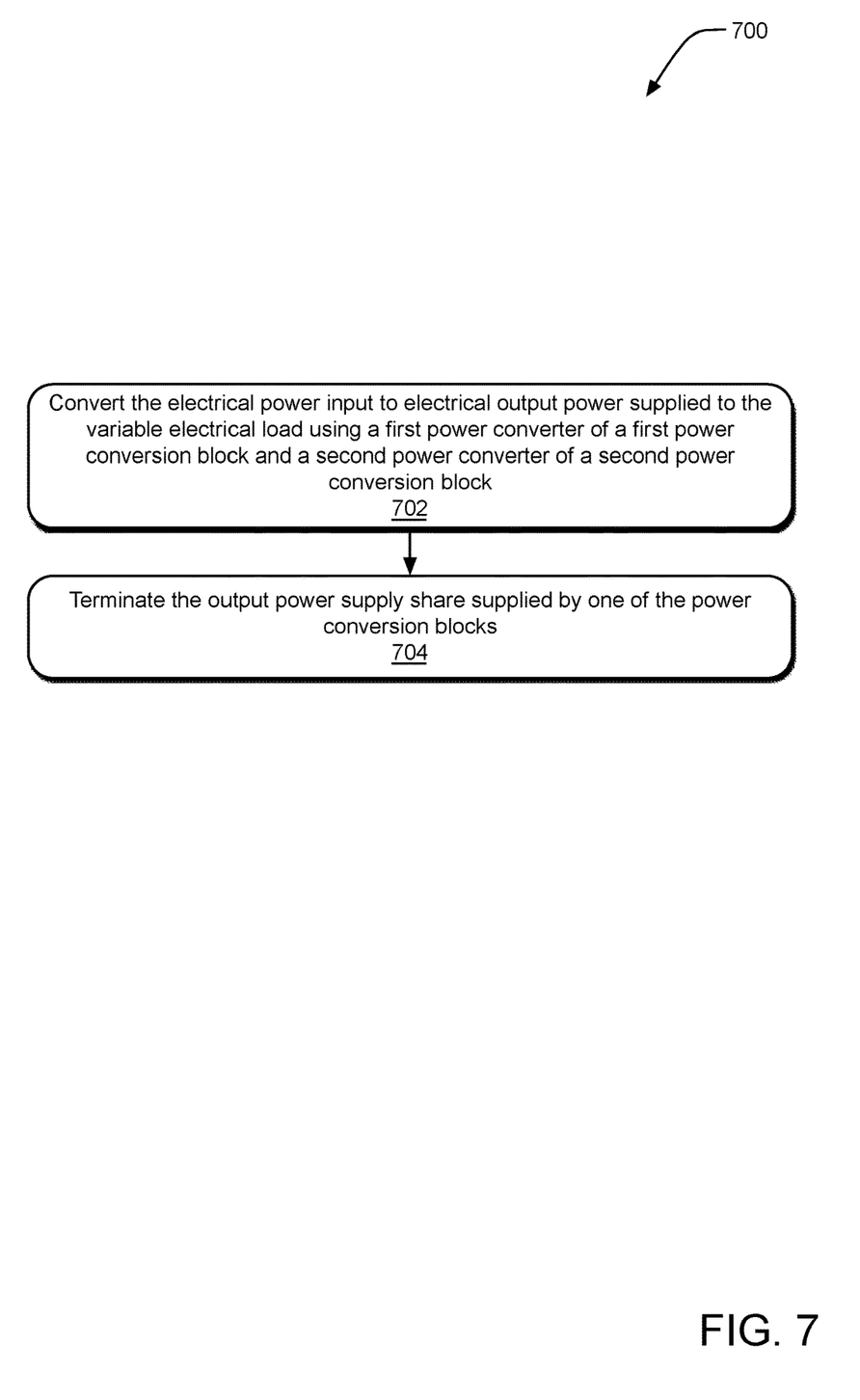
FIG. 7 illustrates example operations for dynamic loading for switching power supplies.

FIG. 7 illustrates example operations 700 for dynamic loading for a switching power supply unit (PSU). The example operations 700 provide power from an electrical power input to a common output node. A conversion operation 702 convert the electrical power input to output power supplied to the common output node using a first power conversion block and a second power conversion block. The first power conversion block is configured to supply a first power supply share to the common output node and to decrease output voltage from the first power conversion block while output current from the first power conversion block reaches a rated current level. The second power conversion block is configured with a predesignated open circuit voltage setting and is further configured to supply a second power supply share to the common output node and to contribute the second output power supply share to the common output node while the output voltage at the common output node has decreased to the predesignated electrical voltage setting.

In one implementation, a controlling operation 704 terminates the output power supply share supplied to the common output node from one of the power conversion blocks while the output voltage at the common output node is at the open circuit voltage setting of the other power conversion block. If the PSU includes multiple auxiliary power conversion blocks, then the controlling operation 704 can terminate the output power supply share supplied to the common output node from any of the power conversion blocks, even if the output voltage at the common output node is at the open circuit voltage setting of such power conversion blocks.

Figure 8:
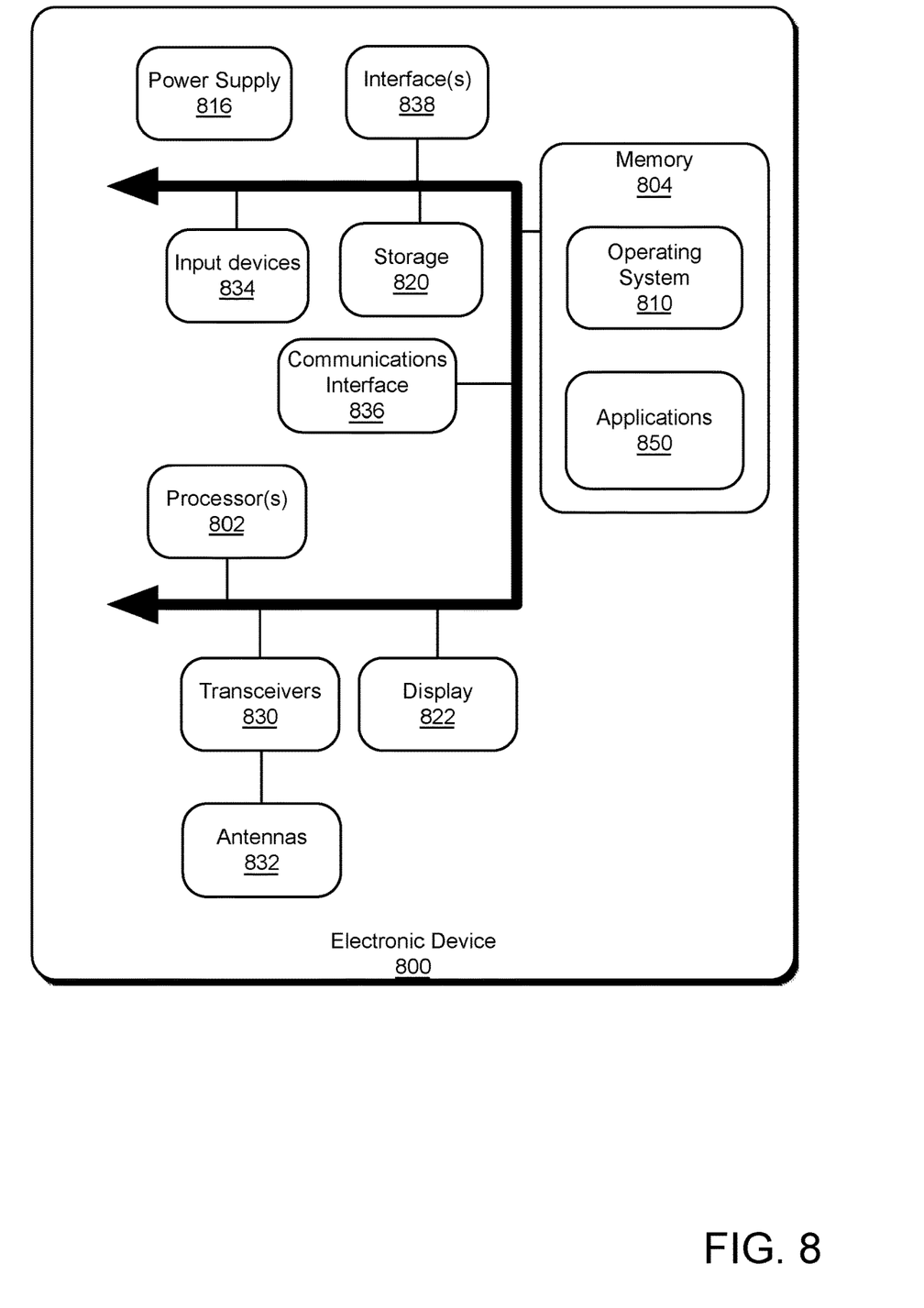
FIG. 8 illustrates exampled hardware and software that can be useful in implementing the described technology.

FIG. 8 illustrates an example electronic device 800 (such as a computing device or a communications device) for implementing the features and operations of the described technology. The electronic device 800 may embody a remote control device or a physical controlled device and is an example network-connected and/or network-capable device and may be a client device, such as a laptop, mobile device, desktop, tablet; a server/cloud device; an Internet-of-Things device; an electronic accessory; or another electronic device. The electronic device 800 includes one or more processor(s) 802 and a memory 804. The memory 804 generally includes both volatile memory (e.g., RAM) and nonvolatile memory (e.g., flash memory). An operating system 810 resides in the memory 804 and is executed by the processor(s) 802.

In an example electronic device 800, as shown in FIG. 8, one or more modules or segments, such as applications 850, conversion block controller software, firmware modules, are loaded into the operating system 810 on the memory 804 and/or storage 820 and executed by processor(s) 802. The storage 820 may include one or more tangible storage media devices and may store predesignated open circuit voltage settings, maximum rated currents, overload current levels, and other data and be local to the electronic device 800 or may be remote and communicatively connected to the electronic device 800.

The electronic device 800 includes a power supply 816, which is powered by one or more batteries or other power sources and which provides power to other components of the electronic device 800. The power supply 816 may also be connected to an external power source that overrides or recharges the built-in batteries or other power sources.

The electronic device 800 may include one or more communication transceivers 830, which may be connected to one or more antenna(s) 832 to provide network connectivity (e.g., mobile phone network, Wi-Fi®, Bluetooth®) to one or more other servers and/or client devices (e.g., mobile devices, desktop computers, or laptop computers). The electronic device 800 may further include a network adapter 836, which is a type of computing device. The electronic device 800 may use the adapter and any other types of computing devices for establishing connections over a wide-area network (WAN) or local-area network (LAN). It should be appreciated that the network connections shown are exemplary and that other computing devices and means for establishing a communications link between the electronic device 800 and other devices may be used.

The electronic device 800 may include one or more input devices 834 such that a user may enter commands and information (e.g., a keyboard or mouse). These and other input devices may be coupled to the server by one or more interfaces 838, such as a serial port interface, parallel port, or universal serial bus (USB). The electronic device 800 may further include a display 822, such as a touch screen display.

The electronic device 800 may include a variety of tangible processor-readable storage media and intangible processor-readable communication signals. Tangible processor-readable storage can be embodied by any available media that can be accessed by the electronic device 800 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the electronic device 800. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote control device and/or a physical controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

An example power supply unit for providing power from an electrical power input to a common output node is provided. A first power conversion block is electrically coupled to convert the electrical power input to a first output power supply share supplied to the common output node. The first power conversion block is configured to decrease output voltage from the first power conversion block based at least in part on output current from the first power conversion block reaching a rated current level. A second power conversion block is electrically coupled to convert the electrical power input to a second output power supply share supplied to the common output node. The second power conversion block is configured with a predesignated open circuit voltage setting and is further configured to contribute the second output power supply share to the common output node based at least in part on the output voltage at the common output node decreasing to the predesignated open circuit voltage setting.

Another example power supply unit of any preceding unit is provided, wherein the first power conversion block is configured with a predesignated open circuit voltage setting that is higher than the predesignated open circuit voltage setting of the second power conversion block.

Another example power supply unit of any preceding unit is provided, wherein the first power conversion block is configured to operate in a constant current mode.

Another example power supply unit of any preceding unit is provided, wherein the second power conversion block is configured to operate in a constant voltage mode.

Another example power supply unit of any preceding unit is provided, wherein the first power conversion block further includes a first power converter and a first feedback control circuit electrically coupled to the first power converter and the common output node to monitor voltage at the common output node.

Another example power supply unit of any preceding unit is provided, further comprising a controller coupled to the first power converter and configured to terminate the first output power supply share supplied to the common output node from the first power conversion block based at least in part on the output voltage at the common output node being above a predesignated open circuit voltage setting of the second power conversion block.

Another example power supply unit of any preceding unit is provided, wherein the second power conversion block further includes a second power converter and a second feedback control circuit electrically coupled to the second power converter and the common output node to monitor voltage at the common output node. The second feedback control circuit enables the second power conversion block to supply electrical power to the common output node if the monitored voltage at the common output node reaches the predesignated open circuit voltage setting of the second power conversion block.

Another example power supply unit of any preceding unit is provided, further comprising a controller coupled to the second power converter and configured to terminate the second output power supply share supplied to the common output node from the second power conversion block based at least in part on the output voltage at the common output node reaching the predesignated open circuit voltage setting of the second power conversion block.

An example method of providing power from an electrical power input to a common output node is provided. The example method includes converting, with a first power conversion block and a second power conversion block, the electrical power input to output power supplied to the common output node. The first power conversion block is configured to supply a first output power supply share to the common output node and to decrease output voltage from the first power conversion block based at least in part on output current from the first power conversion block reaching a rated current level. The second power conversion block is configured with a predesignated open circuit voltage setting and to contribute a second output power supply share to the common output node based at least in part on the output voltage at the common output node decreasing to the predesignated open circuit voltage setting.

Another example method of any preceding method is provided, further comprising terminating the first output power supply share supplied to the common output node from the first power conversion block based at least in part on the output voltage at the common output node being above the predesignated open circuit voltage setting of the second power conversion block.

Another example method of any preceding method is provided, further comprising terminating the second output power supply share supplied to the common output node from the second power conversion block based at least in part on the output voltage at the common output node reaching the predesignated open circuit voltage setting of the second power conversion block.

Another example method of any preceding method is provided, wherein the first power conversion block is configured with a predesignated open circuit voltage setting that is higher than the predesignated open circuit voltage setting of the second power conversion block.

Another example method of any preceding method is provided, wherein the first power conversion block is configured to operate in a constant current mode.

Another example method of any preceding method is provided, wherein the second power conversion block is configured to operate in a constant voltage mode.

An example electrical device including a power supply unit for providing power from an electrical power input to a common output node is provided. The electrical device comprises a first power conversion block electrically coupled to convert the electrical power input to a first output power supply share supplied to the common output node. The first power conversion block is configured to decrease output voltage from the first power conversion block based at least in part on output current from the first power conversion block reaching a rated current level. A second power conversion block is electrically coupled to convert the electrical power input to a second output power supply share supplied to the common output node. The second power conversion block is configured with a predesignated open circuit voltage setting and is further configured to contribute the second output power supply share to the common output node based at least in part on the output voltage at the common output node decreasing to the predesignated open circuit voltage setting.

Another example electrical device of any preceding device is provided, wherein the first power conversion block is configured to operate in a constant current mode.

Another example electrical device of any preceding device is provided, wherein the first power conversion block further includes a first power converter and a first feedback control circuit electrically coupled to the first power converter and the common output node to monitor voltage at the common output node.

Another example electrical device of any preceding device is provided, further comprising a controller coupled to the first power converter and configured to terminate the first output power supply share supplied to the common output node from the first power conversion block based at least in part on the output voltage at the common output node being above the predesignated open circuit voltage setting of the second power conversion block.

Another example electrical device of any preceding device is provided, wherein the second power conversion block further includes a second power converter and a second feedback control circuit electrically coupled to the second power converter and the common output node to monitor voltage at the common output node, wherein the second feedback control circuit enables the second power conversion block to supply electrical power to the common output node if the monitored voltage at the common output node reaches the predesignated open circuit voltage setting of the second power conversion block.

Another example electrical device of any preceding device is provided, further comprising a controller coupled to the second power converter and configured to terminate the second output power supply share supplied to the common output node from the second power conversion block based at least in part on the output voltage at the common output node reaching the predesignated open circuit voltage setting of the second power conversion block.

An example system for providing power from an electrical power input to a common output node is provided. The example system includes means for converting, with a first power conversion block and a second power conversion block, the electrical power input to output power supplied to the common output node. The first power conversion block is configured to supply a first output power supply share to the common output node and to decrease output voltage from the first power conversion block based at least in part on output current from the first power conversion block reaching a rated current level. The second power conversion block is configured with a predesignated open circuit voltage setting and to contribute a second output power supply share to the common output node based at least in part on the output voltage at the common output node decreasing to the predesignated open circuit voltage setting.

Another example system of any preceding system is provided, further comprising means for terminating the first output power supply share supplied to the common output node from the first power conversion block based at least in part on the output voltage at the common output node being above the predesignated open circuit voltage setting of the second power conversion block.

Another example system of any preceding system is provided, further comprising means for terminating the second output power supply share supplied to the common output node from the second power conversion block based at least in part on the output voltage at the common output node reaching the predesignated open circuit voltage setting of the second power conversion block.

Another example system of any preceding method is provided, wherein the first power conversion block is configured with a predesignated open circuit voltage setting that is higher than the predesignated open circuit voltage setting of the second power conversion block.

Another example system of any preceding system is provided, wherein the first power conversion block is configured to operate in a constant current mode.

Another example system of any preceding system is provided, wherein the second power conversion block is configured to operate in a constant voltage mode.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A power supply unit for providing power from an electrical power input to a common output node, comprising:
    a first power conversion block electrically coupled to convert the electrical power input to a first output power supply share supplied to the common output node, the first power conversion block being configured to decrease output voltage from the first power conversion block based at least in part on output current from the first power conversion block reaching a rated current level; and
    a second power conversion block electrically coupled to convert the electrical power input to a second output power supply share supplied to the common output node, the second power conversion block being configured with a predesignated open circuit voltage setting and being further configured to contribute the second output power supply share to the common output node based at least in part on the output voltage at the common output node decreasing to the predesignated open circuit voltage setting.

2. The power supply unit of claim 1, wherein the first power conversion block is configured with a predesignated open circuit voltage setting that is higher than the predesignated open circuit voltage setting of the second power conversion block.

3. The power supply unit of claim 1, wherein the first power conversion block is configured to operate in a constant current mode.

4. The power supply unit of claim 1, wherein the second power conversion block is configured to operate in a constant voltage mode.

5. The power supply unit of claim 1, wherein the first power conversion block further includes a first power converter and a first feedback control circuit electrically coupled to the first power converter and the common output node to monitor the output voltage at the common output node.

6. The power supply unit of claim 5, further comprising:
    a controller coupled to the first power converter and configured to terminate the first output power supply share supplied to the common output node from the first power conversion block based at least in part on the output voltage at the common output node being above predesignated setting of the first power conversion block.

7. The power supply unit of claim 1, wherein the second power conversion block further includes a second power converter and a second feedback control circuit electrically coupled to the second power converter and the common output node to monitor the output voltage at the common output node, wherein the second feedback control circuit enables the second power conversion block to supply electrical power to the common output node if the monitored output voltage at the common output node reaches the predesignated open circuit voltage setting of the second power conversion block.

8. The power supply unit of claim 7, further comprising:
    a controller coupled to the second power converter and configured to terminate the second output power supply share supplied to the common output node from the second power conversion block based at least in part on the output voltage at the common output node reaching the predesignated open circuit voltage setting of the second power conversion block.

9. A method of providing power from an electrical power input to a common output node, the method comprising:
    converting, with a first power conversion block and a second power conversion block, input power from the electrical power input to output power supplied to the common output node, wherein
        the first power conversion block is configured to supply a first output power supply share to the common output node and to decrease output voltage from the first power conversion block based at least in part on output current from the first power conversion block reaching a rated current level, and
        the second power conversion block is configured with a predesignated open circuit voltage setting and to contribute a second output power supply share to the common output node based at least in part on the output voltage at the common output node decreasing to the predesignated open circuit voltage setting.

10. The method of claim 9, further comprising:
    terminating the first output power supply share supplied to the common output node from the first power conversion block based at least in part on the output voltage at the common output node being above the predesignated open circuit voltage setting of the second power conversion block.

11. The method of claim 9, further comprising:
    terminating the second output power supply share supplied to the common output node from the second power conversion block based at least in part on the output voltage at the common output node reaching the predesignated open circuit voltage setting of the second power conversion block.

12. The method of claim 9, wherein the first power conversion block is configured with a predesignated open circuit voltage setting that is higher than the predesignated open circuit voltage setting of the second power conversion block.

13. The method of claim 9, wherein the first power conversion block is configured to operate in a constant current mode.

14. The method of claim 9, wherein the second power conversion block is configured to operate in a constant voltage mode.

15. An electrical device including a power supply unit for providing power from an electrical power input to a common output node, the electrical device comprising:
- a first power conversion block electrically coupled to convert the electrical power input to a first output power supply share supplied to the common output node, the first power conversion block being configured to decrease output voltage from the first power conversion block based at least in part on output current from the first power conversion block reaching a rated current level; and
- a second power conversion block electrically coupled to convert the electrical power input to a second output power supply share supplied to the common output node, the second power conversion block being configured with a predesignated open circuit voltage setting and being further configured to contribute the second output power supply share to the common output node based at least in part on the output voltage at the common output node decreasing to the predesignated open circuit voltage setting.

16. The electrical device of claim 15, wherein the first power conversion block is configured to operate in a constant current mode.

17. The electrical device of claim 15, wherein the first power conversion block further includes a first power converter and a first feedback control circuit electrically coupled to the first power converter and the common output node to monitor the output voltage at the common output node.

18. The electrical device of claim 17, further comprising:
- a controller coupled to the first power converter and configured to terminate the first output power supply share supplied to the common output node from the first power conversion block based at least in part on the output voltage at the common output node being above the predesignated open circuit voltage setting of the second power conversion block.

19. The electrical device of claim 15, wherein the second power conversion block further includes a second power converter and a second feedback control circuit electrically coupled to the second power converter and the common output node to monitor the output voltage at the common output node, wherein the second feedback control circuit enables the second power conversion block to supply electrical power to the common output node if the monitored output voltage at the common output node reaches the predesignated open circuit voltage setting of the second power conversion block.

20. The electrical device of claim 19, further comprising:
- a controller coupled to the second power converter and configured to terminate the second output power supply share supplied to the common output node from the second power conversion block based at least in part on the output voltage at the common output node reaching the predesignated open circuit voltage setting of the second power conversion block.

* * * * *